(12) United States Patent
Naka et al.

(10) Patent No.: US 7,307,944 B2
(45) Date of Patent: Dec. 11, 2007

(54) COMMUNICATION TERMINAL APPARATUS AND SPREADING CODE ESTIMATION METHOD

(75) Inventors: Katsuyoshi Naka, Yokosuka (JP); Akihiko Nishio, Yokosuka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 809 days.

(21) Appl. No.: 10/486,114

(22) PCT Filed: May 16, 2003

(86) PCT No.: PCT/JP03/06097

§ 371 (c)(1),
(2), (4) Date: Feb. 9, 2004

(87) PCT Pub. No.: WO03/098826

PCT Pub. Date: Nov. 27, 2003

(65) Prior Publication Data

US 2004/0179550 A1    Sep. 16, 2004

(30) Foreign Application Priority Data

May 22, 2002  (JP)  ............................. 2002-148286

(51) Int. Cl.
*H04J 13/02*  (2006.01)
(52) U.S. Cl. ...................................... 370/208; 370/342
(58) Field of Classification Search ................ 370/208, 370/342
See application file for complete search history.

(56) References Cited

U.S. PATENT DOCUMENTS

| | | | |
|---|---|---|---|
| 7,133,467 B2 * | 11/2006 | Nishio et al. ............... | 375/316 |
| 7,167,505 B2 * | 1/2007 | Nishio et al. ............... | 375/147 |
| 2002/0181557 A1 | 12/2002 | Fujii | |
| 2004/0202231 A1 * | 10/2004 | Wang et al. ................. | 375/148 |
| 2004/0208234 A1 * | 10/2004 | Naka et al. ................. | 375/148 |
| 2004/0247059 A1 * | 12/2004 | Seto et al. ................... | 375/346 |

FOREIGN PATENT DOCUMENTS

| | | |
|---|---|---|
| EP | 1133071 | 9/2001 |
| JP | 2000315966 | 11/2000 |
| JP | 2002111542 | 12/2002 |
| JP | 200323372 | 1/2003 |
| JP | 2003143034 | 5/2003 |

OTHER PUBLICATIONS

International Search Report dated Jul. 15, 2003.
3GPP TS 25.221 V4.4.0(Mar. 2002), 3rd Generation Partnership Project; Technical Specification Group Radio Access Network; Physical channels and mapping of transport channels onto physical channels (TDD) (Release 4), pp. 1-90.
3GPP TS 25.224 V4.4.0(Mar. 2002), 3rd Generation Partnership Project; Technical Specification Group Radio Access Network; Physical Layer Procedures (TDD) (Release 4), pp. 1-40.

* cited by examiner

*Primary Examiner*—Melvin Marcelo
(74) *Attorney, Agent, or Firm*—Stevens, Davis, Miller & Mosher, LLP

(57) ABSTRACT

A despreading and RAKE combining section despreads a data portion using all spreading codes and RAKE combines the despread signal. An average value calculating section calculates RAKE output average power values of all spreading codes from the RAKE combining result. A threshold setting section sets a threshold value based on the RAKE output average values of the plurality of spreading codes allocated to the own station. A spreading code determining section performs threshold determination between a RAKE output average value obtained from the spreading codes, excepting the spreading codes allocated to the own station, and determines the spreading code, which corresponds to the RAKE output average value exceeding the threshold value, as the spreading code multiplexed into the received signal. This makes it possible to accurately estimate the spreading codes multiplexed into the received signal.

5 Claims, 12 Drawing Sheets

|     | m1 | m2 | m3 | m4 | m5 | m6 | m7 | m8 | m9 | m10 | m11 | m12 | m13 | m14 | m15 | m16 |
| --- | --- | --- | --- | --- | --- | --- | --- | --- | --- | --- | --- | --- | --- | --- | --- | --- |
| 1code | 1 | 0 | 0 | 0 | 0 | 0 | 0 | 0 | 0 | 0 | 0 | 0 | 0 | 0 | 0 | 0 |
| 2codes | 0 | 1 | 0 | 0 | 0 | 0 | 0 | 0 | 0 | 0 | 0 | 0 | 0 | 0 | 0 | 0 |
| 3codes | 0 | 0 | 1 | 0 | 0 | 0 | 0 | 0 | 0 | 0 | 0 | 0 | 0 | 0 | 0 | 0 |
| 4codes | 0 | 0 | 0 | 1 | 0 | 0 | 0 | 0 | 0 | 0 | 0 | 0 | 0 | 0 | 0 | 0 |
| 5codes | 0 | 0 | 0 | 0 | 1 | 0 | 0 | 0 | 0 | 0 | 0 | 0 | 0 | 0 | 0 | 0 |
| 6codes | 0 | 0 | 0 | 0 | 0 | 1 | 0 | 0 | 0 | 0 | 0 | 0 | 0 | 0 | 0 | 0 |
| 7codes | 0 | 0 | 0 | 0 | 0 | 0 | 1 | 0 | 0 | 0 | 0 | 0 | 0 | 0 | 0 | 0 |
| 8codes | 0 | 0 | 0 | 0 | 0 | 0 | 0 | 1 | 0 | 0 | 0 | 0 | 0 | 0 | 0 | 0 |
| 9codes | 0 | 0 | 0 | 0 | 0 | 0 | 0 | 0 | 1 | 0 | 0 | 0 | 0 | 0 | 0 | 0 |
| 10codes | 0 | 0 | 0 | 0 | 0 | 0 | 0 | 0 | 0 | 1 | 0 | 0 | 0 | 0 | 0 | 0 |
| 11codes | 0 | 0 | 0 | 0 | 0 | 0 | 0 | 0 | 0 | 0 | 1 | 0 | 0 | 0 | 0 | 0 |
| 12codes | 0 | 0 | 0 | 0 | 0 | 0 | 0 | 0 | 0 | 0 | 0 | 1 | 0 | 0 | 0 | 0 |
| 13codes | 0 | 0 | 0 | 0 | 0 | 0 | 0 | 0 | 0 | 0 | 0 | 0 | 1 | 0 | 0 | 0 |
| 14codes | 0 | 0 | 0 | 0 | 0 | 0 | 0 | 0 | 0 | 0 | 0 | 0 | 0 | 1 | 0 | 0 |
| 15codes | 0 | 0 | 0 | 0 | 0 | 0 | 0 | 0 | 0 | 0 | 0 | 0 | 0 | 0 | 1 | 0 |
| 16codes | 0 | 0 | 0 | 0 | 0 | 0 | 0 | 0 | 0 | 0 | 0 | 0 | 0 | 0 | 0 | 1 |

FIG.2

| m1 | m2 | m3 | m4 | m5 | m6 | m7 | m8 | |
|---|---|---|---|---|---|---|---|---|
| 1 | 0 | 0 | 0 | 0 | 0 | 0 | 0 | 1code or 9codes |
| 0 | 1 | 0 | 0 | 0 | 0 | 0 | 0 | 2codes or 10codes |
| 0 | 0 | 1 | 0 | 0 | 0 | 0 | 0 | 3codes or 11codes |
| 0 | 0 | 0 | 1 | 0 | 0 | 0 | 0 | 4codes or 12codes |
| 0 | 0 | 0 | 0 | 1 | 0 | 0 | 0 | 5codes or 13codes |
| 0 | 0 | 0 | 0 | 0 | 1 | 0 | 0 | 6codes or 14codes |
| 0 | 0 | 0 | 0 | 0 | 0 | 1 | 0 | 7codes or 15codes |
| 0 | 0 | 0 | 0 | 0 | 0 | 0 | 1 | 8codes or 16codes |

FIG.3

| m1 | m3 | m5 | m7 | |
|---|---|---|---|---|
| 1 | 0 | 0 | 0 | 1 or 5 or 9 or 13codes |
| 0 | 1 | 0 | 0 | 2 or 6 or 10 or 14codes |
| 0 | 0 | 1 | 0 | 3 or 7 or 11 or 15codes |
| 0 | 0 | 0 | 1 | 4 or 8 or 12 or 16codes |

FIG.4

COMMUNICATION TERMINAL APPARATUS AND SPREADING CODE ESTIMATION METHOD

TECHNICAL FIELD

The present invention relates to a communication terminal apparatus and spreading code estimation method that estimates spreading codes multiplexed into a received signal using a common midamble.

BACKGROUND ART

As a method for demodulating a received signal, attention has been paid to Joint Detection (hereinafter referred to as "JD") that is used. JD is a demodulation method for removing various types of interference such as interference between symbols, interference between codes due to multipath fading to extract a demodulation signal. Here, in order to execute JD accurately, in a receiving apparatus, it is necessary to recognize all spreading codes multiplexed into the received signal. However, regarding multiplexed spreading codes, it is the only spreading codes allocated to a own station that a communication terminal apparatus correctly recognizes, and spreading codes allocated to the other station are not informed from a radio base station. Accordingly, it is necessary to accurately estimate the spreading codes allocated to the other station.

As a method for estimating spreading codes allocated to the other station to execute JD, the following method can be given. A shift amount of midamble codes used in a time slot (hereinafter referred to as "TS") is detected and the number of spreading codes multiplexed in the TS is recognized from the detected shift amount. After despreading a data portion using all spreading codes, average power values (hereinafter referred to as "RAKE output average values) per one symbol are calculated from the RAKE combining result, and RAKE output average values corresponding to the number of recognized spreading codes are selected. These selected spreading codes are determined as being multiplexed in the received signal.

Hereinafter, an explanation will be given of the generation of midamble codes using FIG. 1. Regarding the generation of midamble codes, first of all, it is assumed that two basic codes each having 456 chips are continuously prepared. It is assumed that the midamble code is formed of 512 chips and the basic code, which is shifted by one chip from the right end of continuous two basic codes and corresponds to 512 chips, is generated as a midamble code #1 as illustrated in FIG. 1. Next, it is assumed that the basic code, which is shifted left to the midamble code #1 by 57 and corresponds to 512 chips, is generated as a midamble code #2. Similarly, the basic code is shifted left by 57 chips as ensuring 512 chips to generate a midamble code #3 to a midamble code #8.

A midamble code #9 is a basic code, which is shifted left to the midamble code #1 by 29 chips and corresponds to 512 chips. Similar to the generation of the midambles #2 to #8, the basic code is shifted left by 57 chips as ensuring 512 chips to generate a midamble code #10 to a midamble code #15. Moreover, a midamble code #16 is a code, which is cyclically shifted right to the midamble code #1 by 28 chips and corresponds to 512 chips.

In this way, since the basic code is shifted by a predetermined amount as ensuring 512 chips to generate each midamble code, the midamble code x is hereinafter referred to as midamble shift with a shift amount x or midamble shift x ($x: 1 \leq x \leq 16$).

In addition, the number of midamble shifts generated from the basic code is Kcell, and any one of values 16, 8, 4 is given. When Kcell=16, midamble shifts 1 to 16 are used, when Kcell=8, midamble shifts 1 to 8 are used, and when Kcell=4, midamble shifts 1, 3, 5, 7 are used, respectively.

In 3GPP specification TS25.221 V4.4.0 (at the time of using a common midamble where a midamble shift and the number of spreading codes are made to correspond to each other), the number of types of spreading codes allocatable to the respective communication terminals is 16, and a corresponding relationship with the number of spreading codes (the number of spreading codes multiplexed into the same TS) is established. More specifically, this can be explained using FIGS. 2 to 4.

FIG. 2 is a view illustrating a relationship between the midamble shifts and the number of spreading codes when the number of types of common midambles is 16 (Kcell=16). Moreover, FIG. 3 is a view illustrating a relationship between the midamble shifts and the number of spreading codes when the number of types of common midambles is 8 (Kcell=8). FIG. 4 is a view illustrating a relationship between the midamble shifts and the number of spreading codes when the number of types of common midambles is 4 (Kcell=4). In FIGS. 2 to 4, m1 to m16 indicate the shift amount of midamble, and 1 code to 16 codes indicate the total number of spreading codes multiplexed into the received signal in one slot. In the table, "0" indicates that no corresponding relationship between the midamble and the number of spreading codes is established, and "1" indicates that a corresponding relationship between the midamble shift and the number of spreading codes is established. As illustrated in FIGS. 2 to 4, when Kcell=16, one type of spreading codes corresponds to one midamble shift, when Kcell =8, two types of spreading codes correspond to one midamble shift, and when Kcell=4, four types of spreading codes correspond to one midamble shift. A base station inserts the midamble shift, which corresponds to the number of multiplexing spreading codes, into transmission data to transmit to all communication terminal apparatuses in communication. The midamble shift used in this way is hereinafter referred to as common midamble.

Transmission power of the midamble will be next explained using FIG. 5. FIG. 5 is a conceptual view illustrating transmission power and a slot configuration. In a base station apparatus, a midamble portion is inserted between the data portions in one slot and transmitted to the communication terminal apparatus. Regarding the transmission power of the midamble, the same transmission power as the data portion is set as described in 3GPP specification TS25.221 V4.4.0.

FIG. 6 is a block diagram illustration a configuration of a conventional communication terminal apparatus. In the figure, a radio receiving section 12 receives a signal sent from the base station via an antenna 11 and executes a predetermined reception processing (downconvert, A/D conversion, and the like), and outputs it to a delay profile generating section 13 and a despreading and RAKE combining section 19.

The delay profile generating section 13 executes correlation computation to the midamble portion of the received signal using Kcell midamble replica codes to generate Kcell delay profiles, and outputs them to a maximum value detecting section 14 and a path selecting section 16.

The maximum value detecting section 14 detects the respective maximum values based on the delay profiles corresponding to the respective replica codes output from the delay profile generating section 13, and outputs detected Kcell maximum values to a midamble shift determining section 15.

The midamble shift determining section 15 detects a maximum value of Kcell maximum values detected by the maximum value detecting section 14. In other words, a maximum correlation value (hereinafter referred to as "total correlation maximum value") of total correlation values is detected, and the midamble replica code (midamble shift) where the total correlation maximum value is obtained was determined as being used as a common midamble. The determined midamble shift is output to a path selecting section 16 and a spreading code number candidate obtaining section 19.

Hereinafter, a state of a midamble shift determination is illustrated in FIG. 7. FIG. 7 shows a case of Kcell=4, and a vertical axis indicates a maximum correlation value of each midamble shift and a horizontal axis indicates a shift amount of the midamble shift. Maximum values of m1, m3, m5 and m7 used when Kcell=4 detected by the maximum value detecting section 14 are arranged as illustrated in FIG. 7 and m5 indicates a total correlation maximum value as comparison among these maximum values. Accordingly, m5 is determined as being used as a common midamble.

The path selecting section 16 reads the delay profiles of the midamble shifts determined by the midamble shift determining section 15 from the delay profile generating section 13, detects a peak from the read delay profile, selects a path, and outputs the path selection result to a despreading and RAKE combining section 17, and a JD operating section 21.

The despreading and RAKE combining section 17 performs despreading over a plurality of symbols of the data portion using all spreading codes according to the path selected by the path selecting section 16, RAKE combines the despread signal and outputs the RAKE combined signal to an average value calculating section 18. Moreover, the despreading and RAKE combining section 17 despreads an entirety of the data portion, RAKE combines the despread result, and outputs the RAKE combining result to a JD operating section 21.

The average value calculating section 18 calculates power average values per one symbol, namely, RAKE output average values, from the RAKE combining results over the plurality of symbols output from the despreading and RAKE combining section 17, and outputs them to an average value sorting section 20.

The spreading code number candidate obtaining section 19 holds a table (corresponding to FIGS. 2 to 4) where the midamble shifts and the number of spreading codes are made to correspond to each other, obtains candidates for the number of spreading codes corresponding to the midamble shifts output from the midamble shift determining section 15 from the table, and outputs the obtained candidates for the number of spreading codes to the average value sorting section 20.

The average value sorting section 20 selects RAKE output average values equivalent to the total number of spreading codes calculated by the average value calculating section 18 in descending order of level, and outputs the spreading codes equivalent to the selected RAKE output average values to the JD operating section 21.

The JD operating section 21 performs JD operation using the path selecting result output from the path selecting section 16, the RAKE combining result output from the despreading and RAKE combining section 17, and the spreading codes output from the average value sorting section 20, and outputs the operation result to a decoding section (not shown).

As mentioned above, the conventional communication terminal apparatus selects RAKE output average values equivalent to the number of spreading codes corresponding to the midamble shifts determined by midamble shift determination in descending order of level, and estimates the spreading codes corresponding to the selected RAKE output average values as spreading codes multiplexed into the received signal.

However, in the cases excepting for Kcell=16 where no one-to-one correspondence between the midamble shift and the number of spreading codes is established, the number of candidates for the number of spreading codes corresponding to one midamble shift is multiple, so that the number of spreading codes cannot be determined correctly and the spreading code multiplexed into the received signal cannot be estimated. For example, in the case of Kcell=8, the number of candidates for the number of spreading codes to one midamble shift is two, and it is not unclear which spreading code number should be used to select the number of spreading codes from the RAKE output average values.

DISCLOSURE OF THE INVENTION

An object of the present invention is to provide a communication terminal apparatus and spreading code estimation method that estimates spreading codes multiplexed into a received signal accurately even when the number of candidates for the number of spreading codes corresponding to one midamble shift is multiple.

The above object can be attained in such a way that the received signal is despread using spreading codes allocated to a own station, thereafter setting a threshold value based on a RAKE combining value of the despreading result, the received signal is despread using spreading codes excepting for the spreading codes allocated to the own station, thereafter performing threshold determination between the RAKE combining value of the despreading result and the set threshold value, and a spreading code where the RAKE combining value exceeding the threshold value is obtained is determined as being multiplexed into the received signal.

BRIEF DESCRIPTION OF THE DRAWINGS

FIG. 2 is a view illustrating a relationship between midamble shifts and the number of spreading codes when the number of types of common midambles is 16 (Kcell=16);

FIG. 3 is a view illustrating a relationship between midamble shifts and the number of spreading codes when the number of types of common midambles is 8 (Kcell=8);

FIG. 4 is a view illustrating a relationship between midamble shifts and the number of spreading codes when the number of types of common midambles is 4 (Kcell=4);

BEST MODE FOR CARRYING OUT THE INVENTION

Embodiments of the present invention will be explained using the drawings.

Embodiment 1

Embodiment 1 of the present invention explains a case in which spreading codes multiplexed into a received signal are estimated without specifying the number of spreading codes multiplexed into the received signal even when the number of candidates for the number of spreading codes corresponding to the midamble shifts.

Figure 1:
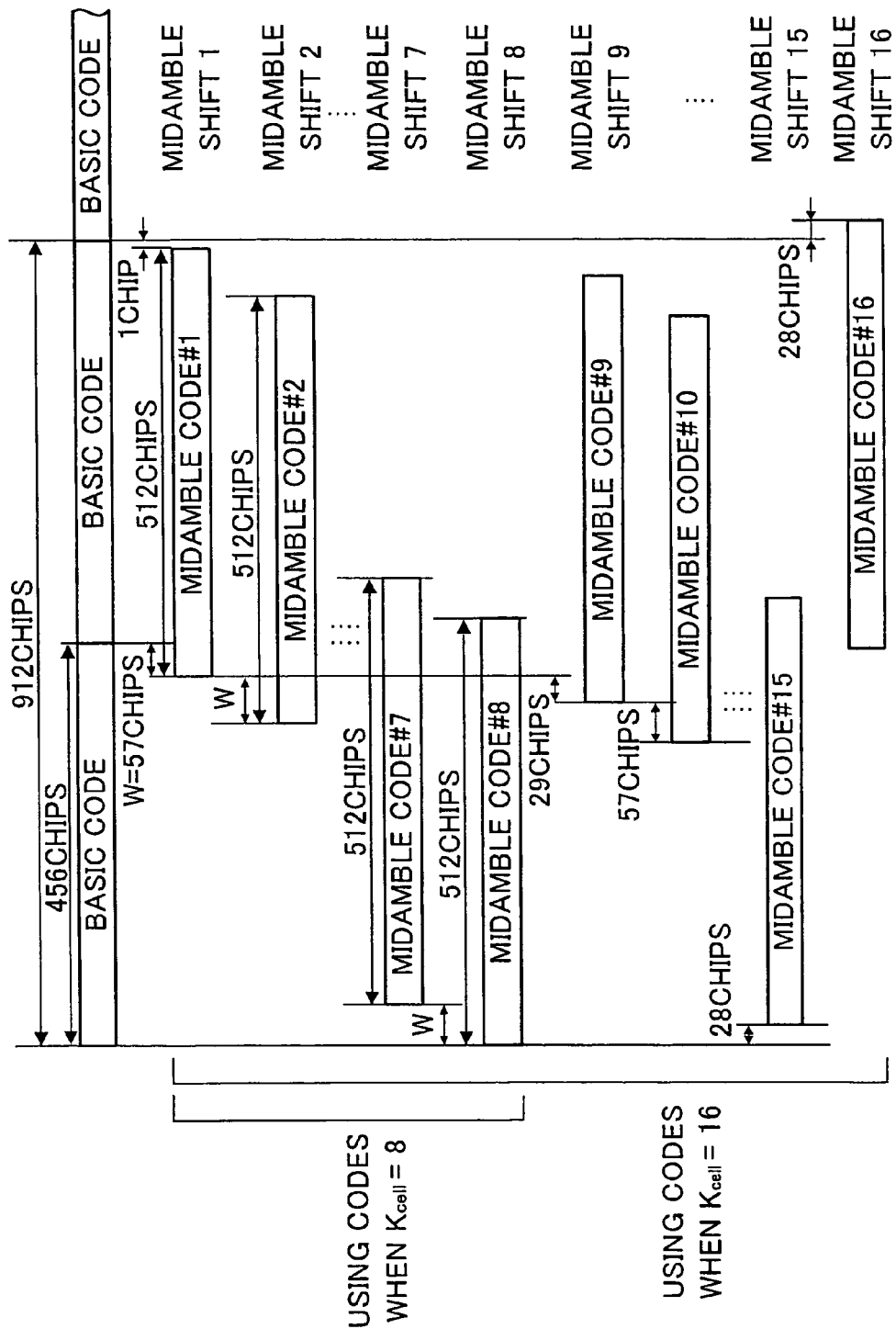
FIG. 1 is a view illustrating the generation of midamble shifts.
Figure 5:
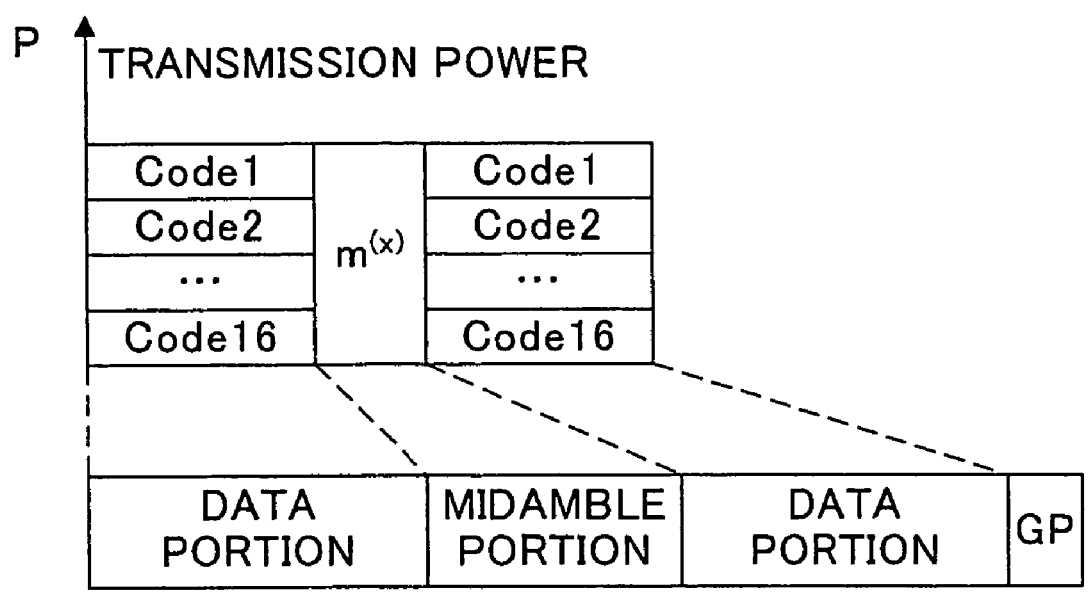
FIG. 5 is a conceptual view illustrating transmission power and a slot configuration.
Figure 6:
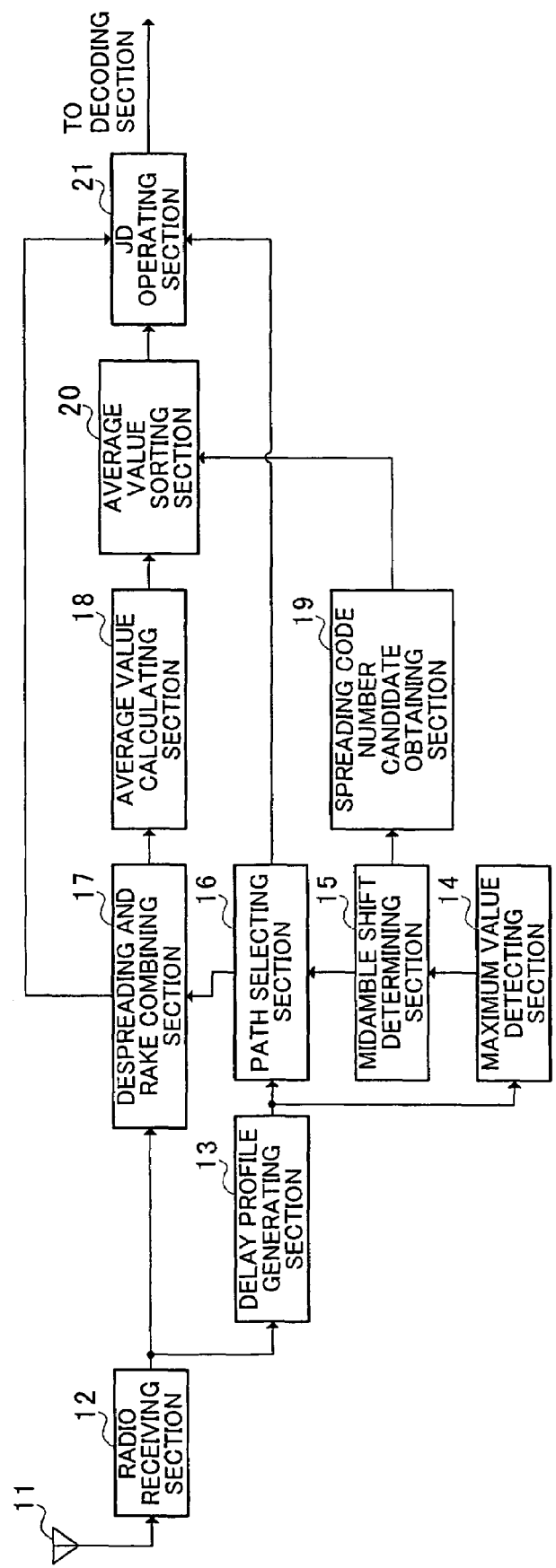
FIG. 6 is a block diagram illustrating a configuration of a conventional communication terminal apparatus.
Figure 7:
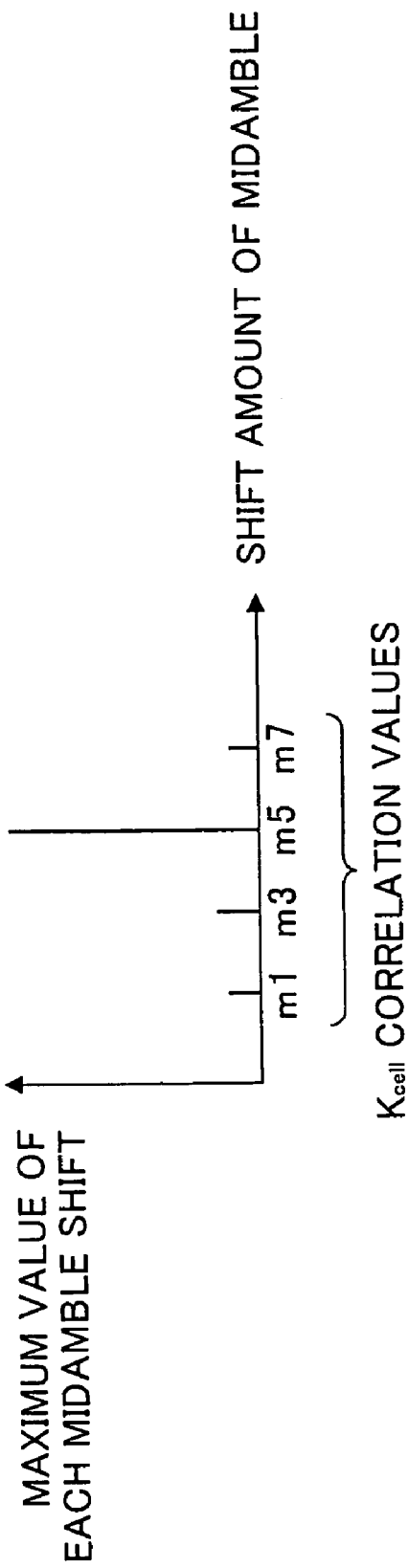
FIG. 7 is a view illustrating a midamble shift determination.
Figure 8:
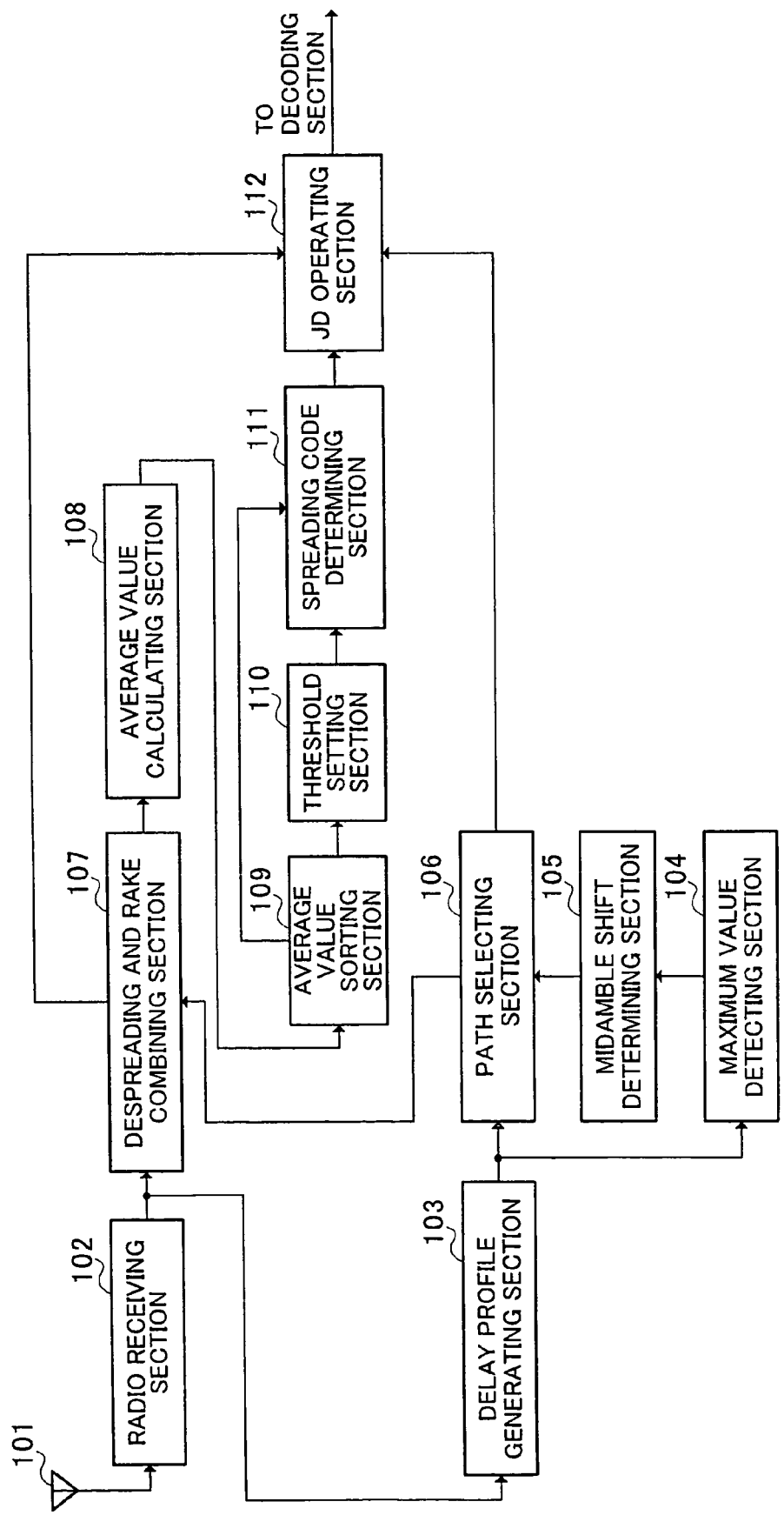
FIG. 8 is a block diagram illustrating a configuration of a communication terminal apparatus according to Embodiment 1 of the present invention.

FIG. 8 is a block diagram illustrating a configuration of a communication terminal apparatus according to Embodiment 1 of the present invention. In this figure, a radio receiving section 102 receives a signal sent from a base station via an antenna 101 and executes a predetermined reception processing (downconvert, A/D conversion, and the like) to the received signal, and outputs it to a delay profile generating section 103 and a despreading and RAKE combining section 107.

The delay profile generating section 103 executes correlation computation to a midamble portion of the received signal using Kcell midamble replica codes to generate delay profiles, respectively. The generated delay profiles are output to a maximum value detecting section 104 and a path selecting section 106.

The maximum value detecting section 104 detects the respective maximum values based on the delay profiles corresponding to the respective replica codes output from the delay profile generating section 103, and outputs detected Kcell maximum values to a midamble shift determining section 105.

The midamble shift determining section 105 is a known signal determining section and detects a maximum value of Kcell maximum values detected by the maximum value detecting section 104. In other words, a maximum correlation value (hereinafter referred to as "total correlation maximum value") of total correlation values is detected and the midamble replica code (midamble shift) where the total correlation maximum value was obtained is determined as being used as a common midamble. The determined midamble shifts are output to a path selecting section 106.

The path selecting section 106 reads the delay profile of the midamble shift determined by the midamble shift determining section 105 from the delay profile generating section 103, detects a peak from the read delay profile, selects a path, and outputs the path selection result to a despreading and RAKE combining section 107, and a JD operating section 112.

The despreading and RAKE combining section 107 performs despreading over a plurality of symbols of the data portion using all spreading codes according to the path selected by the path selecting section 106, RAKE combines the despread signal and outputs the RAKE combined signal to an average value calculating section 108. Moreover, the despreading and RAKE combining section 107 despreads an entirety of the data portion using all spreading codes, and RAKE combines the despread result. The RAKE combining result of the entirety of the data portion is output to a JD operating section 112.

The average value calculating section 108 calculates power average values per one symbol (hereinafter referred to as "RAKE output average value") from the RAKE combining results over the plurality of symbols output from the despreading and RAKE combining section 107, and outputs the calculated RAKE output average values to an average value sorting section 109.

The average value sorting section 109 sorts the RAKE output average values equivalent to all spreading codes output from the average value calculating section 108 in descending order, and outputs the sorted results to a threshold setting section 110 and a spreading code determining section 111.

As a threshold setting reference value, the threshold setting section 110 uses a minimum value of the RAKE output average values using the plurality of spreading codes allocated to a own station from the sorted results output from the average value sorting section 109, and sets a threshold value used in the spreading code determining section 111 at a position lowered by a predetermined width from the reference value. The set threshold value is output to the spreading code determining section 111.

The spreading code determining section 111 performs threshold determination between the RAKE output average value obtained from the spreading codes excepting for the spreading codes allocated to the own station among the sorted results output from the average value sorting section 109 and the threshold value output from the threshold setting section 110. When the result exceeds the threshold value, the corresponding spreading code is determined as being multiplexed into the received signal and the determined spreading code is output to the JD operating section 112.

The JD operating section 112 performs a JD operation using spreading codes of the other stations output from the spreading code determining section 111, a channel estimation value output from the path selecting section 106, and spreading codes allocated to the own station, and outputs the operation result to the decoding section.

Figure 9:
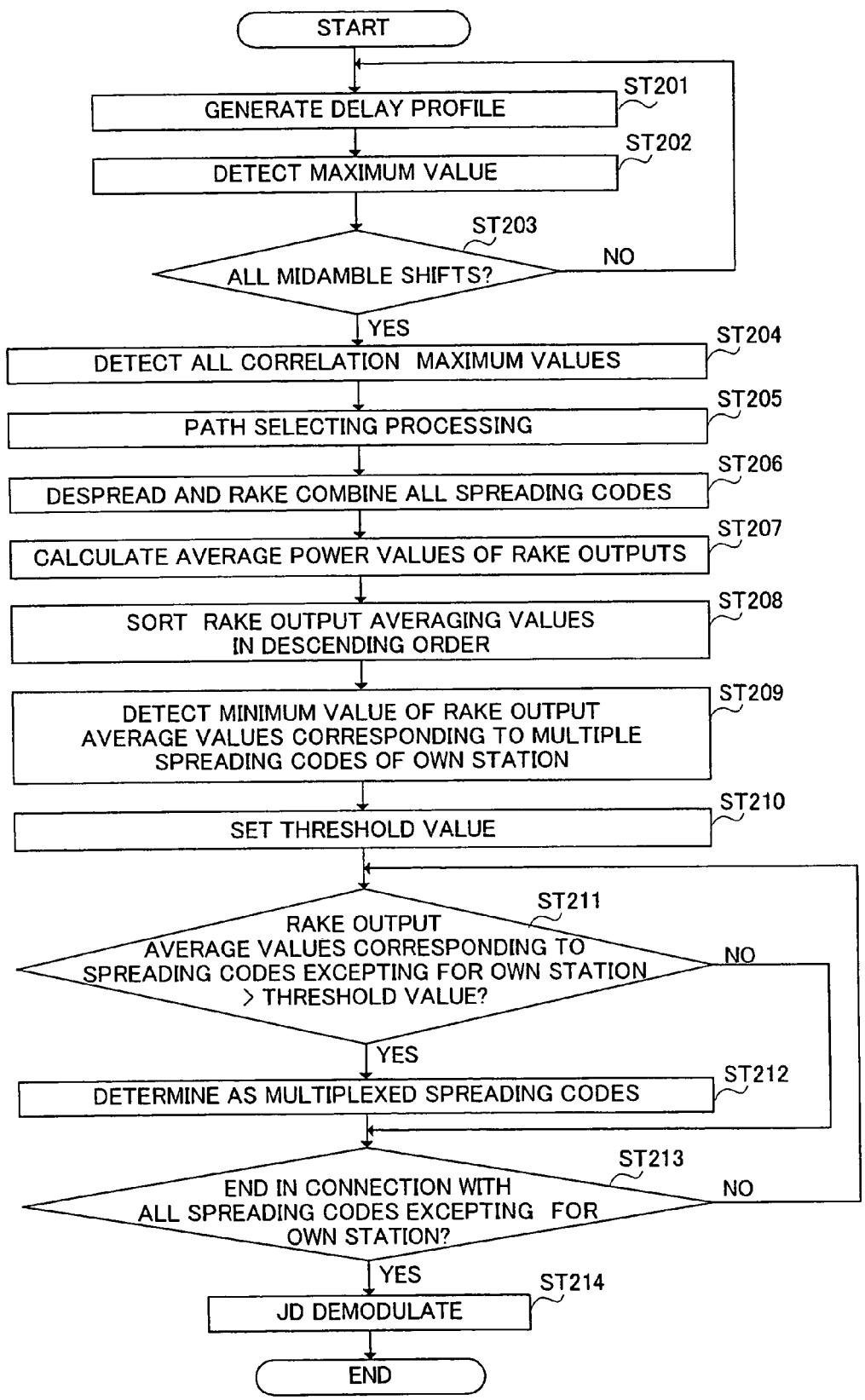
FIG. 9 is a flowchart illustrating operations of a communication terminal apparatus according to Embodiment 1 of the present invention.

An explanation will be next given of operations of the communication terminal apparatus having the aforementioned configuration using FIG. 9. FIG. 9 is a flowchart illustrating operations of the communication terminal apparatus according to Embodiment 1 of the present invention. In this figure, in ST201, the delay profile generating section 103 performs correlation between a midamble shift included in the received signal and a midamble replica code to generate a delay profile. In ST202, the maximum value detecting section 104 detects a maximum value on the delay profile generated in ST201. In ST203, the maximum value detecting section 104 checks whether the maximum values of all midamble shifts are detected. When the maximum values of all midamble shifts are detected, the processing proceeds to ST204. When the maximum values of all midamble shifts are not detected, the processing goes back to ST201, and ST201 to ST203 are repeated until the maximum values of all midamble shifts are detected.

In ST204, the midamble shift determining section 105 detects a total correlation maximum value of Kcell maximum values detected in ST202. A midamble replica code (midamble shift) where the total correlation maximum value was obtained is determined as being used as a common midamble.

In ST205, the path selecting section 106 detects a peak from the delay profile of the midamble shift (common midamble) corresponding to the total correlation maximum value detected in ST204 to select a path.

In ST206, the despreading and RAKE combining section 107 performs despreading over a plurality of symbols of the data portion using all spreading codes according to the path selected in ST205, and RAKE combines the despread signal.

In ST207, the average value calculating section 108 calculates a power average value per one symbol (RAKE output average value) of each spreading code from the RAKE combining results equivalent to the plurality of symbols in connection with all spreading codes obtained in ST206.

In ST208, the average value sorting section 109 sorts the RAKE output average values calculated in ST207 in descending order.

In ST209, the threshold setting section 110 detects a minimum value of the RAKE output average values based on the sorted result in ST208 after despreading using the plurality of spreading codes allocated to the own station. In ST210, the minimum value detected in ST209 is used as a threshold setting reference value and a threshold value used in the spreading code determining section 111 is set at a position lowered by a predetermined width from the reference value. This makes it possible to easily set a determination reference on whether the spreading codes excepting for the spreading codes allocated to the own station are multiplexed into the received signal.

In ST211, the spreading code determining section 111 performs threshold determination between the RAKE output average value obtained from the spreading codes excepting for the spreading codes allocated to the own station among the sorted results in ST 208 and the threshold value set in ST210 to determine whether the RAKE output average value exceeds the threshold value. When the RAKE output average value exceeds the threshold value, the processing moves to ST212, and when the RAKE output average value is less than the threshold value, the processing moves to ST213.

In ST212, the spreading code corresponding to the RAKE output average value determined as exceeding the threshold value in ST211 is determined as a spreading code multiplexed into the received signal. This makes it possible to accurately estimate the spreading codes multiplexed into the received signal without specifying the number of spreading codes multiplexed into the received signal even when the number of candidates for the number of spreading codes corresponding to the common midamble shift.

In ST213, it is checked whether the threshold determination of the corresponding RAKE output average value ends in connection with all spreading codes excepting for the spread code allocated to the own station. When the threshold determination ends in connection with all spreading codes excepting for the spread code allocated to the own station, the processing moves to ST214, and when it does not end, the processing goes back to ST211, and ST211 to ST213 are repeated until the threshold determination ends in connection with all spreading codes excepting for the spread code allocated to the own station.

Figure 10:
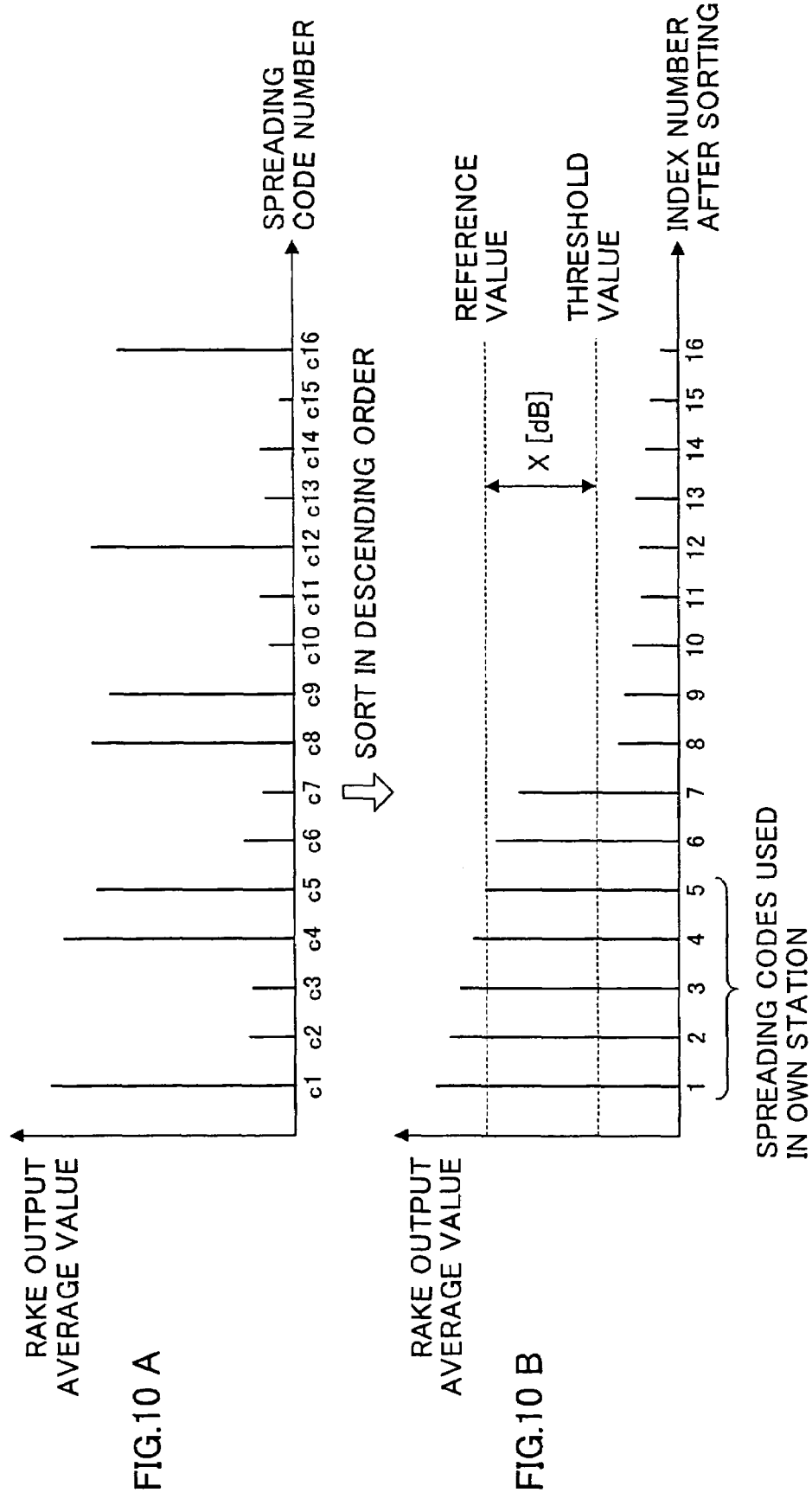
FIG. 10A is a view illustrating operations in a despreading and RAKE combining section to a spreading code determining section according to Embodiment 1 of the present invention.
FIG. 10B is a view illustrating operations in a despreading and RAKE combining section to a spreading code determining section according to Embodiment 1 of the present invention.

Hereinafter, operations of ST207 to ST213 will be specifically explained using FIGS. 10A and 10B. FIGS. 10A and 10B are views explaining the operations of the despreading and RAKE combining section 107 to the spreading code determining section 111 in Embodiment 1.

FIG. 10A shows a state in which a vertical axis indicates a RAKE output average value and a horizontal axis indicates a spreading code number and the average value calculating section 108 calculates the RAKE output average value in connection with each of all spreading codes in ST207. FIG. 10B shows a state in which the average value sorting section 109 sorts the RAKE output average values shown in FIG. 10A in descending order. In this figure, a horizontal axis indicates an index number after sorting, for example, indexes numbers 1 to 5 are spreading codes allocated to the own station. The averaging value sorting section 109 holds a corresponding relationship between the code number and the index number before and after sorting.

In ST209, the threshold setting section 110 uses the spreading code corresponding to the minimum value of the RAKE output average values among the spreading codes allocated to the own station as the threshold setting reference value. Hereinafter, the RAKE output average value corresponding to the spreading code shown by index 5 is used as the threshold setting reference value. Moreover, in ST210, the threshold setting section 110 sets a threshold value used in the spreading code determining section 111 at a position lowered by a predetermined width from the reference value. In FIG. 10B, the threshold value is set at a position lowered by X [dB] from the reference value. In ST211, the spreading code determining section 111 determines whether the spreading codes excepting for the spreading codes allocated to the own station exceed the threshold value. FIG. 10B shows that indexes exceeding the threshold value are 6 and 7 from the threshold determination on the RAKE output average values shown by indexes 6 to 16. In ST212, spreading codes shown by indexes 6 and 7 excepting for the spreading codes allocated to the own station are determined as being multiplexed into the received signal.

In ST214, the JD operating section 112 performs the JD operation using spreading codes determined as being multiplexed into the received signal in ST212, the spreading codes allocated to the own station and the channel estimation value. Since the JD operation is performed using the accurately determined spreading codes, the JD operation can be performed accurately to improve interference removal performance.

Additionally, in the present embodiment, the threshold setting section uses the minimum value of the RAKE output average values corresponding to the spreading codes allocated to the own station as the threshold setting reference value and sets the threshold used in the spreading code determining section lowered at a position by a predetermined width from the reference value. However, the maximum value of the RAKE output average values, or a value obtained by averaging the RAKE output average values corresponding to the spreading codes allocated to the own station between the spreading codes allocated to the own station, may be used as the threshold setting reference value.

In this case, though the setting threshold value is set at the position lowered by the predetermined width from the threshold setting reference value, the predetermined width differs according to the type of the threshold setting reference value.

In this way, according to this embodiment, even when the number of candidates for the number of spreading codes corresponding to the midamble shifts is multiple, the threshold value is set based on the RAKE output average values obtained from the spreading codes allocated to the own station and the threshold determination on the RAKE output average values obtained from the other spreading codes and the threshold value is performed, thereby enabling to accurately estimate the spreading codes multiplexed into the received signal without specifying the number of spreading codes multiplexed into the received signal.

Embodiment 2

Embodiment 2 explains a case in which when the number of candidates for the number of spreading codes corresponding to one midamble shift is multiple, it is determined whether the spreading codes obtained by removing the number of spreading codes allocated to the own station from the maximum value of the candidates for the spreading codes are spreading codes multiplexed into the received signal to reduce the number of times of threshold determination carried out at the time of determining the spreading codes excepting for the spreading codes allocated to the own station.

Figure 11:
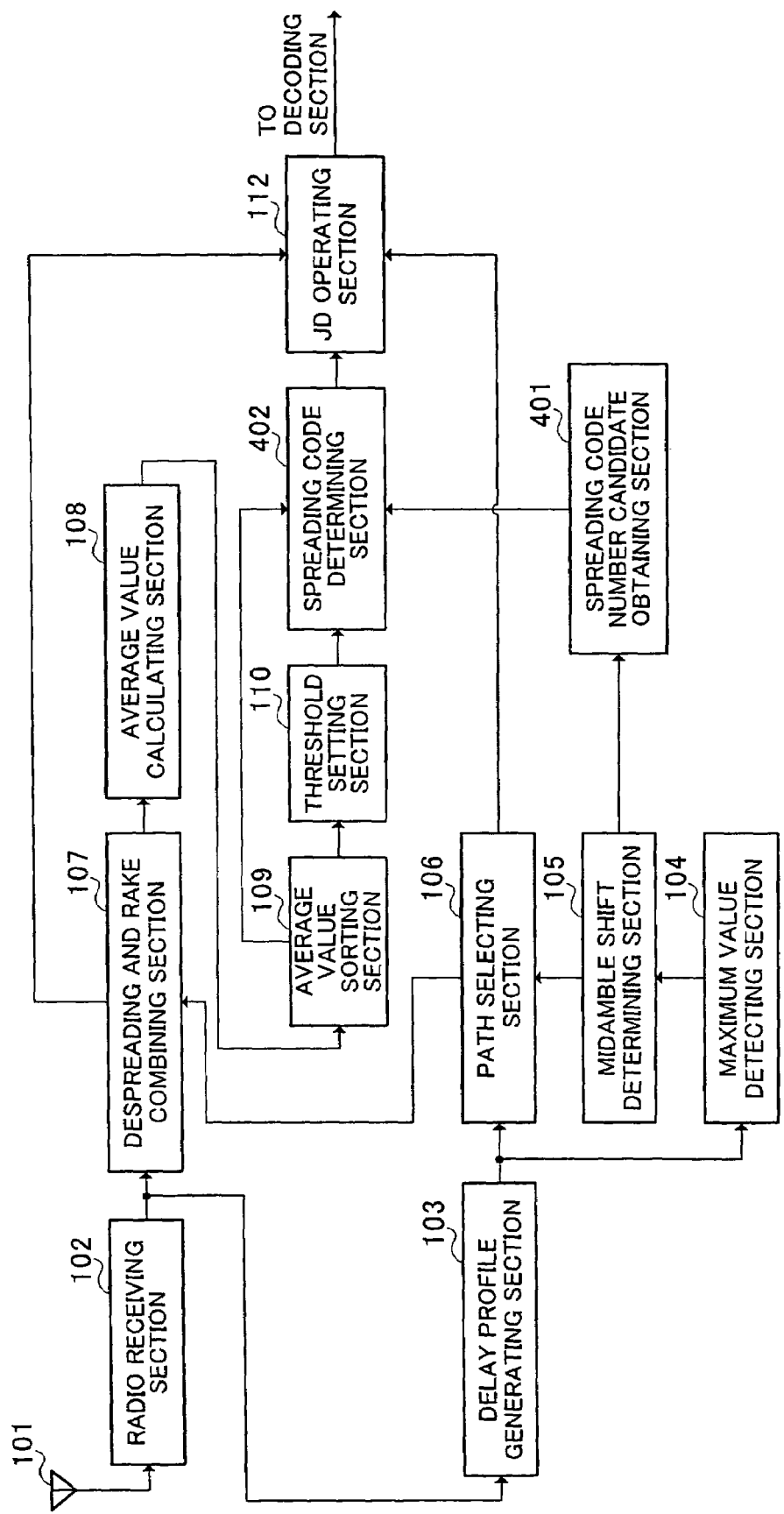
FIG. 11 is a block diagram illustrating a configuration of a communication terminal apparatus according to Embodiment 2 of the present invention.

FIG. 11 is a block diagram illustrating a configuration of a communication terminal apparatus according to Embodiment 2 of the present invention. However, in this figure, parts common to those in FIG. 8 are assigned the same reference numerals as in FIG. 8 and their detailed explanations are omitted. FIG. 11 differs from FIG. 8 in the points that a spreading code number candidate obtaining section 401 is provided and the spreading code determining section 111 is changed to a spreading code determining section 402.

The spreading code number candidate obtaining section 401 holds a table where the midamble shift and the number of spreading codes are made to correspond to each other, and obtains the candidates for the number of spreading codes corresponding to the common midamble determined by the midamble shift determining section 105, and outputs the candidate for the maximum number of spreading codes among the obtained candidates for the number of spreading codes to the spreading code determining section 402.

Regarding the spreading codes, which are obtained by subtracting the number of spreading codes allocated to the own station from the candidates for the number of spreading codes output from the spreading code number candidate obtaining section 401, the spreading code determining section 402 performs threshold determination with the threshold value set by the threshold setting section 110 in order from the top of the RAKE output average values corresponding to the spreading codes excepting for the spreading codes allocated to the own station. The spreading codes corresponding to the RAKE output average values determined as exceeding the threshold value are output to the JD operating section 112.

An explanation will be next given of the operations of the communication terminal apparatus having the aforementioned configuration. Additionally, regarding the same operations as the communication terminal apparatus of Embodiment 1, the detailed explanation is omitted. In the following explanation, it is assumed that the candidates for the number of spreading codes corresponding to one midamble shift are $N(1)$, $N(2)$, ..., $N(k)$ in order of increasing the number of spreading codes (k is a value obtained by the number of spreading codes used in one cell and Kcell values) More specifically, an explanation will be given on the assumption that $N(1)=1$, $N(2)=5$, $N(3)=9$, $N(4)=13$ and the number of spreading codes allocated to the own station is 5 in the case of Kcell=4 and m1.

The midamble shift determining section 105 detects a maximum value of Kcell (4 in this case) maximum values detected by the maximum value detecting section 104. In other words, the midamble shift determining section 105 detects a total correlation maximum value and the midamble shift (m1 in this case) where the total correlation maximum value was obtained is determined as being used as a common midamble. The determined m1 is output to the spreading code number candidate obtaining section 401.

The spreading code number candidate obtaining section 401 obtains $N(1)=1$, $N(2)=5$, $N(3)=9$, $N(4)=13$, which are the candidates for the number of spreading codes corresponding to m1 output from the midamble shift determining section 105, from the table held by the spreading code number candidate obtaining section 401, and outputs $N(4)=13$, which is the candidate for the maximum number of spreading codes, to the spreading code determining section 402.

The spreading code determining section 402 performs threshold determination between top eight RAKE output average values, which correspond to the spreading codes excepting for the spreading codes allocated to the own station and which are values obtained by subtracting the number of spreading codes allocated to the own station "5" from $N(4)=13$ output from the spreading code number candidate obtaining section 401, and the threshold value set by the threshold setting section 110. This makes it possible to improve possibility that threshold determination on all spreading codes excepting for the spreading codes allocated to the own station will not be performed. Namely, in the case of the aforementioned example, the number of spreading codes is limited to 13 codes of all 16 spreading codes and the threshold determination on 8 codes may be performed, so that the number of times of threshold determination can be reduced as compared with the threshold determination on all 16 codes. Accordingly, it is possible to improve a reduction in an amount of processing in the communication terminal apparatus. Particularly, the effect of reducing the amount of processing is brought to the fore as the value of $N(k)$ (the maximum value of the candidates for the number of spreading codes) decreases.

As a result of the threshold determination by the spreading code determining section 402, the spread codes corresponding to the RAKE output average values determined as exceeding the threshold value are determined as being multiplexed into the received signal, and is output to the JD operating section 112 together with the spreading codes allocated to the own station.

In this way, according to this embodiment, when the number of candidates for the number of spreading codes corresponding to one midamble shift is multiple, the spreading codes obtained by removing the number of spreading codes allocated to the own station from the maximum value of the candidates for the spreading codes are subjected to the spreading code determination to reduce the number of times of the threshold determination carried out at the time of determining the spreading codes excepting for the spreading codes allocated to the own station, thereby improving a reduction in an amount of processing in the communication terminal apparatus.

Embodiment 3

Embodiment 3 of the present invention explains a case in which spreading codes multiplexed into the received signal are determined based on comparison in values of large and small between the total value of the number of spreading codes determined as being multiplexed into the received signal in Embodiment 2 and the number of spreading codes allocated to the own station and candidates for the number of spreading codes corresponding to the common midamble.

Figure 12:
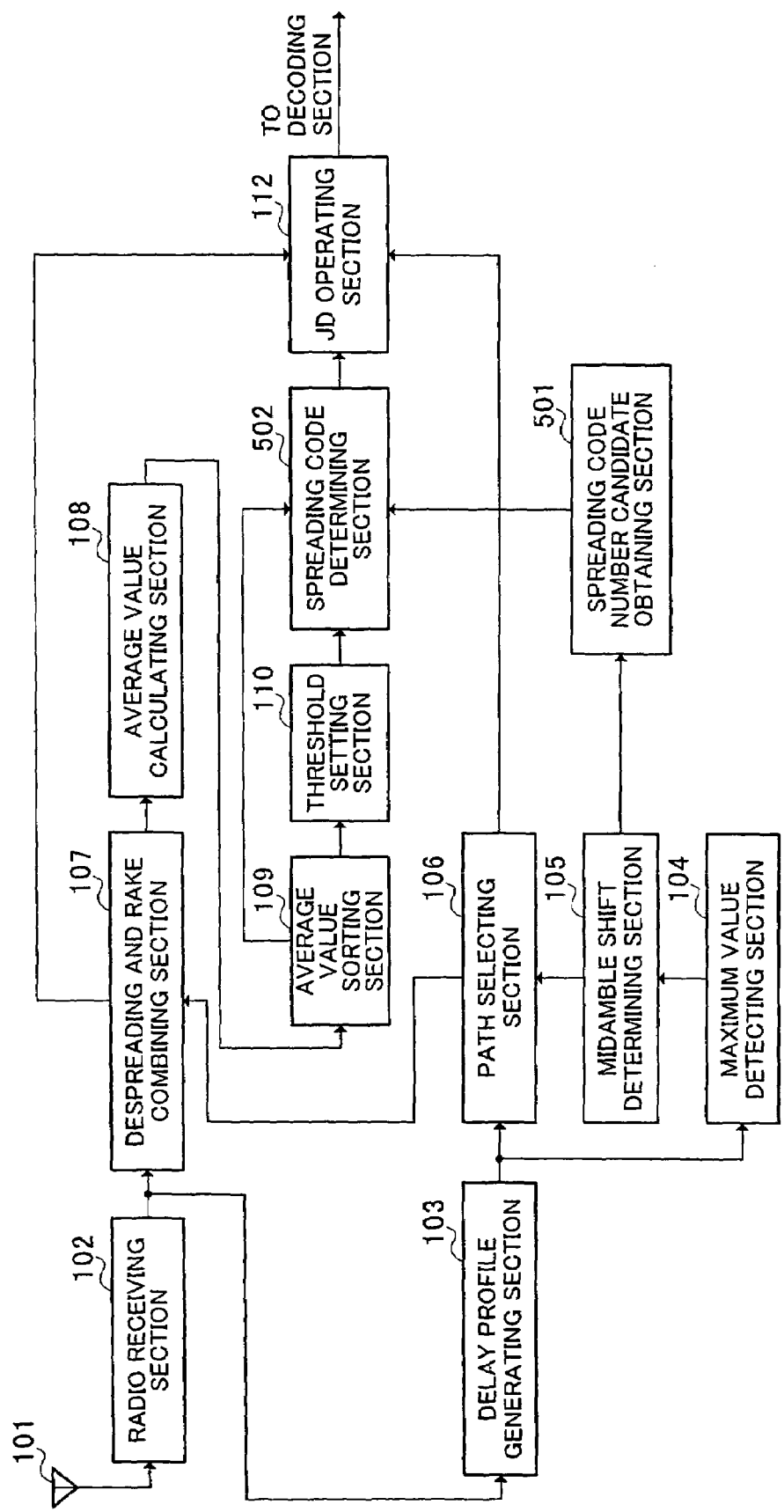
FIG. 12 is a block diagram illustrating a configuration of a communication terminal apparatus according to Embodiment 3 of the present invention.

FIG. 12 is a block diagram illustrating a configuration of a communication terminal apparatus of Embodiment 3 of the present invention. However, in this figure, parts common to those in FIG. 11 are assigned the same reference numerals as in FIG. 11 and their detailed explanations are omitted. FIG. 12 differs from FIG. 11 in the points that the spreading code number candidate obtaining section 401 is changed to a spreading code number candidate obtaining section 501 and that the spreading code determining section 402 is changed to a spreading code determining section 502.

The spreading code number candidate obtaining section 501 holds a table where the midamble shift and the number of spreading codes are made to correspond to each other, and obtains the candidates for the number of spreading codes corresponding to the common midamble determined by the midamble shift determining section 105, and outputs the candidates for the maximum number of spreading codes to the spreading code determining section 502.

The spreading code determining section 502 performs determination on the spreading codes multiplexed into the received signal using a sorting result of the RAKE output average values output from the average value sorting section 109, a threshold value output from the threshold setting section 110, and candidates for the number of spreading codes output from the spreading code number candidate obtaining section 501. This will be specifically explained later. The spreading codes determined as being multiplexed into the received signal are output to the JD operating section 112.

Figure 13:
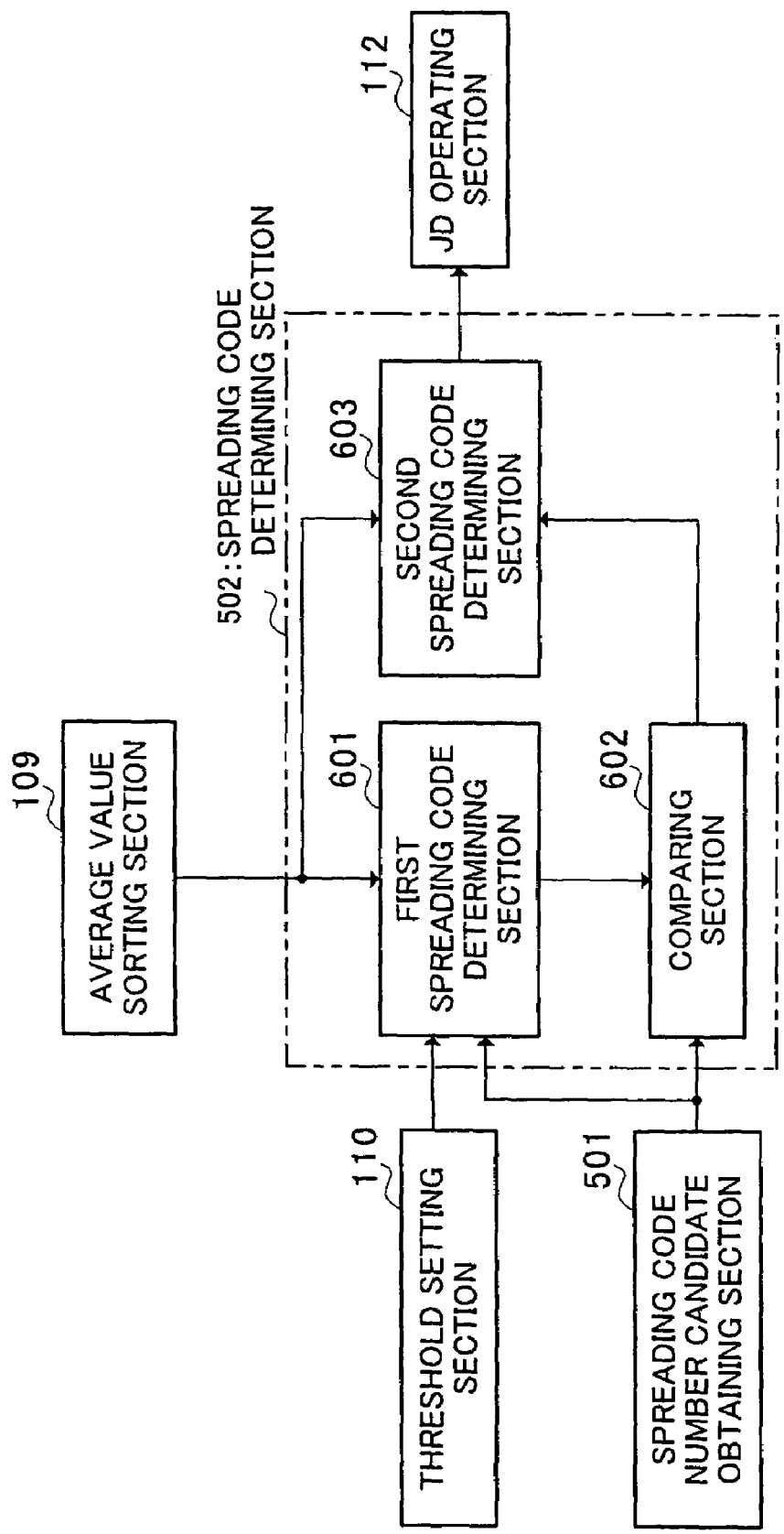
FIG. 13 is a block diagram illustrating an internal confirmation of a spreading code determining section according to Embodiment 3 of the present invention.

An explanation will be next given of an internal configuration of the spreading code determining section 502 using FIG. 13. Regarding the spreading codes, which are obtained by subtracting the number of spreading codes allocated to the own station from the candidates for the maximum number of spreading codes output from the spreading code number candidate obtaining section 501, a first spreading code determining section 601 performs threshold determination with the threshold value set by the threshold setting section 110 in order from the top of the RAKE output average values corresponding to the spreading codes excepting for the spreading codes allocated to the own station. The spreading codes corresponding to the RAKE output average values determined as exceeding the threshold value is determined as spreading codes multiplexed into the received signal. At this point, the number of spreading codes multiplexed into the received signal is a and the number of spreading codes a is output to a comparing section 602.

The comparing section 602 performs comparison in values of large and small between candidates N(1) to N(k) for the number of spreading codes output from the spreading code number candidate obtaining section 501 and the number of spreading codes a. As a result of comparison, a candidate (as b), which is more than a and the nearest to a, is output to a second spreading code determining section 603.

The second spreading code determining section 603 determines the candidate b output from the comparing section 602 as the number of spreading codes multiplexed into the received signal, and finally determines that the spreading codes, which correspond to b RAKE output average values in order from the top of the RAKE output average values, are spreading codes multiplexed into the received signal. This is because a case can be considered where the RAKE output average values do not slightly exceed the threshold value due to influences of an error and the like up to the calculation of the RAKE output average values, and in such a case, the spreading codes multiplexed into the received signal are accurately determined. Accordingly, even when the spreading codes are not determined as being multiplexed into the received signal by the first spreading code determining section 601, they can be finally determined as spreading codes multiplexed into the received signal by the second spreading code determining section 603. In this embodiment, since the base station apparatus selects and transmits the midamble shift based on the number of spreading codes multiplexed into the received signal, the base station apparatus uses the fact that reliability of the number of spreading codes corresponding to the midamble shift is high.

In this way, according to this embodiment, by performing the threshold determination between the threshold value set based on the RAKE output average values corresponding to the spreading codes allocated to the own station and the other RAKE output average values, the spreading codes can be determined as being multiplexed into the received signal based on the candidates for the number of spreading codes corresponding to the common midamble even when there are the spreading codes that are not determined as being multiplexed into the received signal.

A communication terminal apparatus of the present invention that receives a signal where known signals, which correspond to the number of spreading codes multiplexed into an information signal, and the information signal are multiplexed thereinto from a base station apparatus, adapts a configuration including a despreading and RAKE combining section that despreads the information signal multiplexed into the received signal using all spreading codes which are possible to be multiplexed into the received signal and RAKE combines the despreading result, a known signal determining section that specifies a known signal multiplexed into the received signal among the plurality of known signals, a spreading code number candidate obtaining section that obtains candidates for the number of spreading codes corresponding to the known signal determined by the known signal determining section, a spreading code determining section that determines whether spreading codes excepting for spreading codes allocated to a own station are multiplexed into the received signal based on the candidates for the number of spreading codes obtained by the spreading code number candidate obtaining section and a level of the RAKE combing result obtained by the despreading and RAKE combining section, and a JD operating section that performs joint detection operation using the spreading codes determined as being multiplexed into the received signal.

According to this configuration, by determining whether the spreading codes excepting for the spreading codes allocated to the own station are multiplexed into the received signal based on the level of the RAKE combining result obtained by the despreading and RAKE combining section using the spreading codes allocated to the own station, the spreading codes multiplexed into the received signal can be accurately determined to perform joint detection operation using the accurately determined spreading codes, thereby making it possible to improve interference removal performance.

The communication terminal apparatus the present invention adopts wherein the spreading code determining section includes a threshold setting section that uses a minimum value of the level of the RAKE combining result obtained by the despreading and RAKE combining section as a threshold setting reference value using the plurality of spreading codes allocated to the own station and sets a threshold value based on the threshold setting reference value when the number of spreading codes allocated to the own station is multiple.

According to this confirmation, the minimum value of the level of the RAKE combining result obtained the despreading and RAKE combining section using the plurality of spreading codes allocated to the own station is used as the threshold setting reference value, thereby making it possible to easily set the determination reference on whether the spreading codes excepting for the spreading codes allocated the own station are multiplexed into the received signal, and threshold determination is executed based on the threshold value, thereby making it possible to determine the spreading codes multiplexed into the received signal.

The communication terminal apparatus of the preset invention adopts a configuration wherein the spreading code determining section determines whether the spreading codes obtained by removing the number of spreading codes allocated to the own station from the maximum number of spreading codes among the candidates for the number of spreading codes obtained by the spreading code candidate obtaining section are spreading codes multiplexed into the received signal.

According to this configuration, by determining whether the spreading codes obtained by removing the number of spreading codes allocated to the own station from the maximum number of spreading codes among the candidates for the number of spreading codes obtained by the spreading code candidate obtaining section are spreading codes multiplexed into the received signal, all spreading codes do not have to be determined when the number of spreading codes to be served as the candidates is smaller than all spreading codes which are possible to be multiplexed into the received signal, so that an amount of processing carried out by the communication terminal apparatus can be reduced.

The communication terminal apparatus of the present invention adopts a configuration wherein the spreading code determining section includes a first spreading code determining section that determines whether the spreading codes excepting for the spreading codes allocated to the own station are multiplexed into the received signal based on the level of the despreading and RAKE combining result, a comparing section that performs comparison in values of large and small between a total value of the number of spreading codes determined as being multiplexed into the received signal by the first spreading code determining section and the number of spreading codes allocated to the own station and the plurality of candidates for the number of spreading codes obtained by the spreading code number candidate obtaining section, and a second spreading code determining section selects RAKE combining results equivalent to the number of spreading codes shown by the candidate, which is more than the total value and the nearest to the total value in descending order of level, and determines the spreading codes, which correspond to the selected RAKE combing results, as spreading codes multiplexed into the received signal.

According to this configuration, by specifying the number of spreading codes multiplexed into the received signal based on the comparison in values of large and small between a total value of the number of spreading codes determined by the first spreading code determining section and the number of spreading codes allocated to the own station and the plurality of candidates for the number of spreading codes obtained by the spreading code number candidate obtaining section, even when the spreading codes are not determined as the spreading codes multiplexed into the received signal by the first spreading code determining section, they can be determined as the spreading codes multiplexed into the received signal by the second spreading code determining section, so that the spreading codes multiplexed into the received signal can be accurately determined.

A spreading code estimation method of the present invention includes the despreading and RAKE combining step of despreading an information signal multiplexed into a received signal using all spreading codes which are possible to be multiplexed into the received signal to RAKE combine the despreading result, and the spreading code determining step of determining whether spreading codes excepting for spreading codes allocated to a own station are multiplexed into the received signal based on a level of the RAKE combing result obtained in the despreading and RAKE combining step using the spreading codes allocated to the own station.

According to this method, by determining whether the spreading codes excepting for the spreading codes allocated to the own station are multiplexed into the received signal based on the level of the RAKE combining result obtained by the despreading and RAKE combining step using the spreading codes allocated to the own station, the spreading codes multiplexed into the received signal can be accurately determined.

As explained above, according to the present invention, after despreading using the despreading codes allocated to the own station, the threshold value is set based on the RAKE output average value, and threshold determination between the set threshold value and the RAKE output average value is performed after despreading using the despreading codes excepting for the spreading codes allocated to the own station, so that the spreading codes multiplexed into the received signal can be accurately determined even when the candidates for the number of spreading codes corresponding to the common midamble is multiple.

This application is based on the Japanese Patent Application No. 2002-148286 filed on May 22, 2002, entire content of which is expressly incorporated by reference herein.

INDUSTRIAL APPLICABILITY

The present invention is suitable for use in a communication terminal apparatus and spreading code estimation method that estimates spreading codes multiplexed into a received signal using a common midamble.

The invention claimed is:

1. A communication terminal apparatus that receives a signal where known signals, which correspond to the number of spreading codes multiplexed into an information signal and the information signal are multiplexed thereinto from a base station apparatus, comprising:

a despreading and RAKE combining section that despreads the information signal multiplexed into the received signal using all spreading codes which are possible to be multiplexed into the received signal and RAKE combines the despreading result;

a known signal determining section that specifies a known signal multiplexed into the received signal among the plurality of known signals;

a spreading code number candidate obtaining section that obtains candidates for the number of spreading codes corresponding to the known signal determined by said known signal determining section;

a spreading code determining section that determines whether spreading codes excepting for spreading codes allocated to a own station are multiplexed into the received signal based on the candidates for the number of spreading codes obtained by said spreading code number candidate obtaining section and a level of the RAKE combining result obtained by said despreading and RAKE combining section; and a JD operating section that performs joint detection operation using the spreading codes determined as being multiplexed into the received signal.

2. The communication terminal apparatus according to claim 1, wherein said spreading code determining section includes a threshold setting section that uses a minimum value of the level of the RAKE combining result obtained by said despreading and RAKE combining section as a threshold setting reference value using the plurality of spreading codes allocated to the own station and sets a threshold value based on the threshold setting reference value when the number of spreading codes allocated to the own station is multiple, and wherein said spreading code determining section determines a spreading code that obtains a level of the RAKE combining result exceeding the threshold value to be multiplexed into the received signal.

3. The communication terminal apparatus according to claim 1, wherein said spreading code determining section determines whether the spreading codes obtained by removing the number of spreading codes allocated to the own station from the maximum number of spreading codes among the candidates for the number of spreading codes obtained by said spreading code candidate obtaining section are spreading codes multiplexed into the received signal.

4. The communication terminal apparatus according to claim 1, wherein said spreading code determining section includes a first spreading code determining section that determines whether the spreading codes excepting for the spreading codes allocated to the own station are multiplexed into the received signal based on the level of the despreading and RAKE combining result, a comparing section that performs comparison in values of large and small between a total value of the number of spreading codes determined as being multiplexed into the received signal by said first spreading code determining section and the number of spreading codes allocated to the own station and the plurality of candidates for the number of spreading codes obtained by said spreading code number candidate obtaining section, and a second spreading code determining section selects RAKE combining results equivalent to the number of spreading codes shown by the candidate, which is more than the total value and the nearest to the total value in descending order of level, and determines the spreading codes, which correspond to the selected RAKE combining results, as spreading codes multiplexed into the received signal.

5. A spreading code estimation method comprising:

the despreading and RAKE combining step of despreading an information signal multiplexed into a received signal using all spreading codes which are possible to be multiplexed into the received signal to RAKE combine the despreading result; and the spreading code determining step of determining whether spreading codes excepting for spreading codes allocated to a own station are multiplexed into the received signal based on a level of the RAKE combining result obtained in said despreading and RAKE combining step using the spreading codes allocated to the own station.

* * * * *